Patented May 7, 1935

2,000,305

UNITED STATES PATENT OFFICE

2,000,305

DISTILLATION OF MINERAL OILS, TARS, AND STILL RESIDUES

Alfred M. Thomsen, San Francisco, Calif.

No Drawing. Application February 1, 1930, Serial No. 425,344

6 Claims. (Cl. 75—65)

It has been known for many years that mixing certain sulphur-contaminated oils with metallic oxides and then distilling tended to eliminate sulphur in the distillate by fixing the sulphur as a metallic sulphide. It is also a matter of common knowledge that the presence of such materials influences both the character and yield of distillate, but only to a small extent. Though these facts are well known, yet the use of metallic oxides to-day is about limited to a single instance, e. g., the partial removal of sulphur from certain refinery products where only a small percentage of metallic oxide is required.

The reasons for this anomalous condition are to be sought in the difficulties (chiefly mechanical) encountered when it is desired to distill in the presence of a large percentage of added solids. In order to make clear my invention, I will briefly enumerate what the more important of these difficulties are and then describe how I have overcome them.

In desulphurizing with metallic oxides it is necessary to stop the distillation while the contents of the retort are still very fluid, in order that the oxides may readily settle out on standing. This virtually limits the operation to a eighteen degree product, or ordinary "fuel oil". The quantity of oxides added is generally below ten per cent. (10%) of the weight of the oil. Now in my modification I use never less than one hundred per cent. (100%) of added material, and in special cases two and three times this amount, and the distillation is carried to completion, e. g., until all the distilling substance has become converted into coke.

The necessity of separating and re-activating the metallic oxide employed is an absolutely essential feature, upon which the economics of the desulphurizing process depends. I avoid this feature entirely by using as my re-acting medium a naturally oxidized ore, or a roasted ore, or a furnace product, so selected that its use as an additive material in distillation coincides with the metallurgical treatment it is undergoing in the process of yielding up its valuable components.

As an illustration of the application of this principle, i. e., for roasted ores, I will assume that we are distilling a heavy mineral oil and that we have a complex ore containing gold, silver, copper, lead, zinc and iron, as its principal constituents. This ore is furthermore of a type that will not yield commercial products of zinc, lead and/or copper by some form of differential flotation. The metallurgy of such an ore is to-day considered hopeless, but if it be dead roasted and used as herein specified it becomes partly sulphurized and intimately mixed with the residual carbon from the oil. If now submitted to a smelting process it will yield its zinc principally as fume, its copper principally as matte, its lead principally as metal, its gold and silver contained principally in the metallic lead but partially, also, in the matte, and finally most of the iron and earthy materials as waste slag. Having thus separated a complex ore by means of fire into these furnace products, no difficulty arises in completing their treatment by well-known metallugical processes.

As a naturally oxidized ore is essentially either an oxide, carbonate, hydrate, silicate, sulphate, or arsenate, or an indefinite mixture or combination of two or more of these substances, it follows that this type of material may be substituted for the dead roasted ore in the foregoing illustration.

Likewise, as any furnace product, except slag, be it metal, matte, or speiss, by roasting is converted into either a simple oxide, or a mixture of oxides, or a mixture of less highly oxidized bodies, such as sulphates and arsenates, it follows that such materials may be substituted for the naturally oxidized ores, or roasted ores, in achieving the same object.

Having thus overcome the economic difficulty of using a very large quantity of oxidized metals in the distilling material, there yet remain two very serious mechanical difficulties to be overcome. These are, (a), the mechanical resistance to agitation produced by such a large admixture of solids when the distillation is still far from complete, and which if overcome by a sufficiently heavy and powerful stirring mechanism would yield the coked residue in the undesirable form of a powder instead of in coherent lumps; and, (b), the practical impossibility of preventing the incrustation of the retort by a mixture of ore and carbon, which will soon result in the destruction of the apparatus. I have overcome these difficulties in the following manner:

(A) I perform the first part of the distillation when the charge is still quite fluid in a retort equipped with adequate agitation, which may be mechanical, or steam, or any type of inert gas, or a combination of these, and when the mass becomes too viscous for this apparatus but still sufficiently fluid to flow freely through a large aperture, I transfer it to a series of trays, which I then run into an oven retort, and finish the distillation with the mass at rest. An intimate mixture of the distilling material with the added solids is thus maintained throughout the procedure described; in the first stage by agitation and in the second stage by the high viscosity of the materials which prevents the stratification or settling out of component parts of the mixture. Furthermore, this use of two different types of apparatus for the two stages permits us to obtain the coked residue in the form of relatively large pieces instead of in powder, which is of the utmost importance in all subsequent metallurgical operations.

(B) I overcome the second difficulty, that due to the incrustation of the retort, by performing the distillation upon a fused metallic bath, which may be either a single metal or an alloy. The heat transfer to the oil, therefore, is from the fire to the fused metal, and from the fused metal to the distilling substances. The metallic bath may occupy a permanent position as a pool in the retort, in which case the heat transfer to the bath is through the metal of the retort, or manifestly the metal may be heated apart from the retort and permitted to flow into or through the same, giving up part of its heat to the distilling materials.

My process may therefore be briefly summarized by saying that I mix the substance to be distilled with a very large quantity of either a naturally oxidized ore, or a roasted ore, or oxidized furnace product, so selected that the treatment it receives during the distillation of the oil becomes a desirable or necessary step to its subsequent metallurgical or chemical treatment.

The mechanical difficulties involved are eliminated by performing the distillation in two stages, the first in motion and the second at rest. The difficulty due to retort incrustation is eliminated by performing the operation upon a fused metallic bath.

The advantages gained by my improvements are:

1. That by the presence of such large quantities of additive material a profoundly different and almost sulphur free distillate is produced.

2. That the residual coke produced from the oil in the distilling operation is very advantageously employed, in the subsequent treatment of the added solids, both as fuel and as a reducing agent, due to its intimate admixture and its character as a bonding material.

3. That the life and up-keep of the apparatus employed is favorably affected by the use of the fused metallic bath.

4. That such very heavy mineral oils, tars, and still residues as to-day are only regarded as fuels may, from the standpoint of economics, be advantageously distilled, and profitable recoveries made therefrom.

I claim:

1. In the process of distilling mineral oils, tars, and still residues, the method of commingling same with a finely powdered, oxidized, complex zincy ore, and then distilling said mixture in two stages, to-wit: an agitation stage, and a quiescent stage.

2. In the process of distilling mineral oils, tars, and still residues, the method of distilling same in the presence of metallic oxides in two stages, to-wit: an agitation stage, and a quiescent stage.

3. In the process of distilling mineral oils, tars, and still residues, the method of distilling same in the presence of metallic oxides in two stages, to-wit: an agitation stage upon a fused metallic bath, and a quiescent stage.

4. In the process of distilling mineral oils, tars, and still residues, the method of commingling same with a finely powdered, oxidized complex zincy ore, and then distilling said mixture in two stages, to-wit: an agitation stage, and a quiescent stage; avoiding at all times during the process any cohesion of the magma to heated walls by performing the distillation upon a fused metallic bath.

5. The herein described process of distilling mineral oils, tars, and still residues, which comprises commingling said substances with not less than their own weight of a roasted complex ore containing gold, silver, copper, lead, and zinc; distilling and agitating said mixture in a retort until such becomes too viscous for further agitation; then discharging said mixture into shallow trays and finishing the distillation within an oven-retort until only a mixture of carbon and ore remain, whereby said mixture is obtained in form suitable for the subsequent smelting step required to recover the metals originally present in such ores; and collecting the distillate obtained from both stages of distillation, and avoiding at all times during the process any cohesion to heated walls by performing the distillation upon a fused metallic bath.

6. The herein described process of distilling mineral oils, tars, and still residues, which comprises commingling said substances with not less than their own weight of a roasted complex metallic ore containing gold, silver, copper, lead, zinc, and iron; distilling and agitating such mixture in a retort until it becomes too viscous for such treatment; then discharging said mixture into shallow trays of an oven-retort for a continuance of the distillation in a quiescent stage subsequent to the former agitation stage; collecting the distillate from both stages; continuing the quiescent stage until only a carbonaceous residue containing the additive ore remains; said residue being composed of an exceedingly large number of fine roasted ore particles, each one enveloped in a mantle of carbon, and cemented to its neighbor by the adhesion of the various mantles to one another to form a lumpy mixture suited to the subsequent step of smelting,—whereby the propinquity of the zinc oxide and carbon cause the zinc to volatilize as fume instead of passing into the slag.

ALFRED M. THOMSEN.